(12) United States Patent
Burghardt et al.

(10) Patent No.: US 10,084,604 B2
(45) Date of Patent: Sep. 25, 2018

(54) METHOD OF PROGRAMMING A SMART CARD, COMPUTER PROGRAM PRODUCT AND PROGRAMMABLE SMART CARD

(71) Applicant: NXP B.V., Eindhoven (NL)

(72) Inventors: Arne Burghardt, Hamburg (DE); Thomas Suwald, Hamburg (DE); Fabian Mackenthun, Hamburg (DE); Kiran G. Shekhar, Bangalore (IN)

(73) Assignee: NXP B.V., Eindhoven (NL)

( * ) Notice: Subject to any disclaimer, the term of this patent is extended or adjusted under 35 U.S.C. 154(b) by 162 days.

(21) Appl. No.: 14/681,019

(22) Filed: Apr. 7, 2015

(65) Prior Publication Data
US 2015/0288523 A1   Oct. 8, 2015

(30) Foreign Application Priority Data

Apr. 7, 2014  (EP) .................... 14163732

(51) Int. Cl.
*G06F 21/77* (2013.01)
*G06F 21/12* (2013.01)
(Continued)

(52) U.S. Cl.
CPC .......... *H04L 9/3234* (2013.01); *G06F 21/123* (2013.01); *G06F 21/34* (2013.01);
(Continued)

(58) Field of Classification Search
CPC ............................... G06F 21/123; G06F 21/77
See application file for complete search history.

(56) References Cited

U.S. PATENT DOCUMENTS 6,338,435 B1    1/2002  Carper
8,078,861 B1 *  12/2011 Jarrett, Jr. ................. G06F 8/65
                                                         455/352

(Continued)

FOREIGN PATENT DOCUMENTS

EP    2 575 084 A1    4/2013
EP    2 704 053 A1    3/2014
WO    2011/109780 A2  9/2011

OTHER PUBLICATIONS

"P5CD009—Secure Dual Interface PKI Smart Card Controller", Philips, 11 pg, retrieved from the internet at: http://www.datasheetlib.com/datasheet/459468/p5cd009_nxp-semiconductors.html (Dec. 19, 2005).

(Continued)

*Primary Examiner* — Jason C Chiang

(57) ABSTRACT

There is provided a method of programming a smart card, said smart card comprising a secure element and a microcontroller unit which is connected to said secure element, the method comprising: (a) the secure element receives a firmware image from a host device; (b) the secure element validates the firmware image; (c) the secure element forwards the firmware image to the microcontroller unit if the firmware image is valid; (d) the microcontroller unit receives the firmware image from the secure element; (e) the microcontroller unit extracts firmware from the firmware image; and (f) the microcontroller unit installs the firmware in a memory unit of said smart card. Furthermore, a corresponding computer program product and a corresponding programmable smart card are disclosed.

14 Claims, 2 Drawing Sheets

(51) Int. Cl.
*H04L 9/32* (2006.01)
*G06F 21/34* (2013.01)
*G06F 21/57* (2013.01)
*G06F 21/74* (2013.01)

(52) U.S. Cl.
CPC ............ *G06F 21/572* (2013.01); *G06F 21/74* (2013.01); *G06F 21/77* (2013.01); *H04L 9/3226* (2013.01); *H04L 9/3268* (2013.01)

(56) References Cited

U.S. PATENT DOCUMENTS

| | | | | | |
|---|---|---|---|---|---|
| 8,327,141 | B2 * | 12/2012 | Vysogorets | ............. | G06F 21/34 713/168 |
| 2003/0088868 | A1 * | 5/2003 | Chang | ...................... | G06F 8/65 717/173 |
| 2004/0030877 | A1 * | 2/2004 | Frid | ........................ | G06F 8/654 713/1 |
| 2005/0289646 | A1 * | 12/2005 | Zimmer | ................ | G06F 12/145 726/9 |
| 2006/0097040 | A1 * | 5/2006 | Castillo | ................. | G06F 21/572 235/380 |
| 2006/0282653 | A1 * | 12/2006 | Chu | ........................ | G06F 8/665 713/1 |
| 2008/0072051 | A1 | 3/2008 | Kaabouch et al. | | |
| 2008/0184020 | A1 * | 7/2008 | Gee | ........................ | H04L 67/34 713/2 |
| 2009/0121029 | A1 * | 5/2009 | Asnaashari | ........... | G06F 13/387 235/492 |
| 2010/0012732 | A1 | 1/2010 | Pinzinger et al. | | |
| 2010/0023777 | A1 * | 1/2010 | Prevost | ................. | G06F 21/572 713/180 |
| 2010/0058306 | A1 | 3/2010 | Liles et al. | | |
| 2013/0013261 | A1 | 1/2013 | Niessen et al. | | |
| 2014/0025940 | A1 | 1/2014 | Giraud et al. | | |
| 2014/0143687 | A1 * | 5/2014 | Tan | ........................ | G06F 3/1462 715/757 |
| 2015/0149783 | A1 * | 5/2015 | Clark | .................... | H04L 9/3263 713/175 |
| 2015/0220319 | A1 * | 8/2015 | Weiss | ...................... | G06F 8/665 713/168 |

OTHER PUBLICATIONS

Extended European Search Report for Patent Appln. No. 14163732.2 (dated Jul. 2, 2014).

\* cited by examiner

METHOD OF PROGRAMMING A SMART CARD, COMPUTER PROGRAM PRODUCT AND PROGRAMMABLE SMART CARD

CROSS-REFERENCE TO RELATED APPLICATIONS

This application claims the priority under 35 U.S.C. § 119 of European patent application no. 14163732.2, filed on Apr. 7, 2014, the contents of which are incorporated by reference herein.

FIELD

The present disclosure relates to a method of programming a smart card. Furthermore, the present disclosure relates to a corresponding computer program product and to a corresponding programmable smart card.

BACKGROUND

Today, smart cards are widely used in society. For example, smart cards may be used as electronic identity (eID) cards. The end-user acceptance of such eID cards, however, is still relatively low. Although the eID cards are relatively secure, due to their cryptographic capabilities, they are usually not equipped with a user interface suitable for entering user credentials, i.e. a so-called "authentication interface". As a consequence, the majority of eID users still enter their PIN code through personal computers and laptops, which increases the risk that their credentials are intercepted by malicious software such as Trojans and key-logger programs.

It is known to integrate an authentication interface into a smart card. For example, EP 2 575 084 A1 describes techniques for entering a secret, for example user credentials, into a security token—in particular a smart card—using an embedded tactile sensing user interface with the purpose of verifying the secret against a stored representation of the same secret. In particular, an embodiment of the security token comprises a tactile sensing user interface being arranged to receive a user-encoded secret, a decoding unit being arranged to generate a decoded secret by decoding the user-encoded secret, a comparison unit being arranged to compare the decoded secret with a copy of the secret stored in the token in order to verify the authenticity of a user. Thereby, the security token provides on-card matching functionality.

A smart card of the kind set forth typically comprises a standard microcontroller unit which may, for example, control the tactile sensing user interface. Such a microcontroller unit is typically programmed with firmware before it is integrated into the smart card. Normally the microcontroller unit has special debug interfaces for programming, which cannot be accessed if the microcontroller unit has already been assembled on a smart card. Therefore, it is difficult to program or reprogram the microcontroller unit after it has been assembled on a smart card, for example when the smart card is already in use.

SUMMARY

There is provided a method of programming a smart card, said smart card comprising a secure element and a microcontroller unit which is connected to said secure element, the method comprising: (a) the secure element receives a firmware image from a host device; (b) the secure element validates the firmware image; (c) the secure element forwards the firmware image to the microcontroller unit if the firmware image is valid; (d) the microcontroller unit receives the firmware image from the secure element; (e) the microcontroller unit extracts firmware from the firmware image; and (f) the microcontroller unit installs the firmware in a memory unit of said smart card.

According to an illustrative embodiment, the firmware image comprises an update of previously installed firmware, and the secure element further receives a firmware update request from the host device, validates a certificate of said firmware update request, and performs steps (a), (b) and (c) only if said certificate is valid.

According to a further illustrative embodiment, the secure element validates the firmware image by calculating a checksum of the firmware image and comparing the calculated checksum with a checksum stored in the firmware image.

According to a further illustrative embodiment, the secure element further decrypts the firmware image before calculating a checksum of the firmware image and comparing the calculated checksum with a checksum stored in the firmware image.

According to a further illustrative embodiment, the secure element receives said firmware image from the host device through a contact-based interface unit and/or a contactless interface unit.

According to a further illustrative embodiment, the contact-based interface unit and/or contactless interface unit are controlled by the secure element.

According to a further illustrative embodiment, the microcontroller unit enters into an In-Application Programming (IAP) mode before receiving the firmware image from the secure element.

According to a further illustrative embodiment, the secure element instructs the microcontroller unit to enter into the IAP mode and the secure element notifies the host device when the microcontroller unit is in the IAP mode, such that the host device may initiate programming of the smart card.

According to a further illustrative embodiment, the microcontroller unit comprises a boot loader which is started automatically during start-up of the microcontroller unit.

According to a further illustrative embodiment, the memory unit is comprised in the microcontroller unit.

Furthermore, there is disclosed a computer program product comprising program elements executable by a secure element or a microcontroller unit, wherein said program elements comprise instructions which, when being executed by said secure element or microcontroller unit, cause said secure element and microcontroller unit to carry out or control respective steps of a method as claimed in any preceding claim.

Furthermore, there is disclosed a programmable smart card, said smart card comprising a secure element and a microcontroller unit which is connected to said secure element, wherein: the secure element is arranged to receive a firmware image from a host device; the secure element is arranged to verify whether the firmware image is valid; the secure element forwards the firmware image to the microcontroller unit if the firmware image is valid; the microcontroller unit is arranged to receive the firmware image from the secure element; the microcontroller unit is arranged to extract firmware from the firmware image; and the microcontroller unit is arranged to install the firmware in a memory unit of said smart card.

According to an illustrative embodiment, the smart card is an electronic identification card, a payment card or an access card.

DESCRIPTION OF DRAWINGS

Embodiments will be described in more detail with reference to the appended drawings, in which.

DESCRIPTION OF EMBODIMENTS

In accordance with the present disclosure, a method of programming a smart card is conceived, as well as a corresponding programmable smart card. The smart card comprises a secure element and a microcontroller unit connected to the secure element. In operation, the secure element receives a firmware image from an external host device. Furthermore, the secure element validates the firmware image. Furthermore, the secure element forwards the firmware image to the microcontroller unit if the firmware image is valid. Furthermore, the microcontroller unit receives the firmware image from the secure element and installs the firmware contained in said firmware image in a memory unit of said smart card.

Thus, the secure element may act as a firewall between the host device and the microcontroller, in the sense that the secure element may both receive the firmware image and validate it. In this way, the secure element may offer protection against unauthorized access to the microcontroller unit. In particular, it is possible to install new firmware or firmware updates after the microcontroller unit has been assembled on a smart card, while maintaining an adequate level of security.

The secure element may be implemented as an embedded chip, more specifically as a tamper-resistant integrated circuit with installed or pre-installed smart-card-grade applications, for instance payment applications, which have a prescribed functionality and a prescribed level of security. Examples of such secure elements are the integrated circuits of the so-called SmartMX™ or SmartMX2™ series of IC's produced by NXP Semiconductors. Such a secure element may be arranged to control a contact-based interface unit (according to ISO 7816) and/or a contactless interface unit (according to ISO 14443). The secure element may also implement security functions, such as cryptographic functions and authentication functions. Thus, the secure element may both control the communication with the host device and validate received firmware images, which may increase the level of security.

It is noted that the term 'image' may refer in a broad sense to a container or a package by means of which the firmware is transported. That is to say, by means of such a container or package the firmware may easily be transferred from one entity to another. For example, a firmware image may consist of a deployment package that may be transferred from the host device to the microcontroller unit through the secure element.

Figure 1:
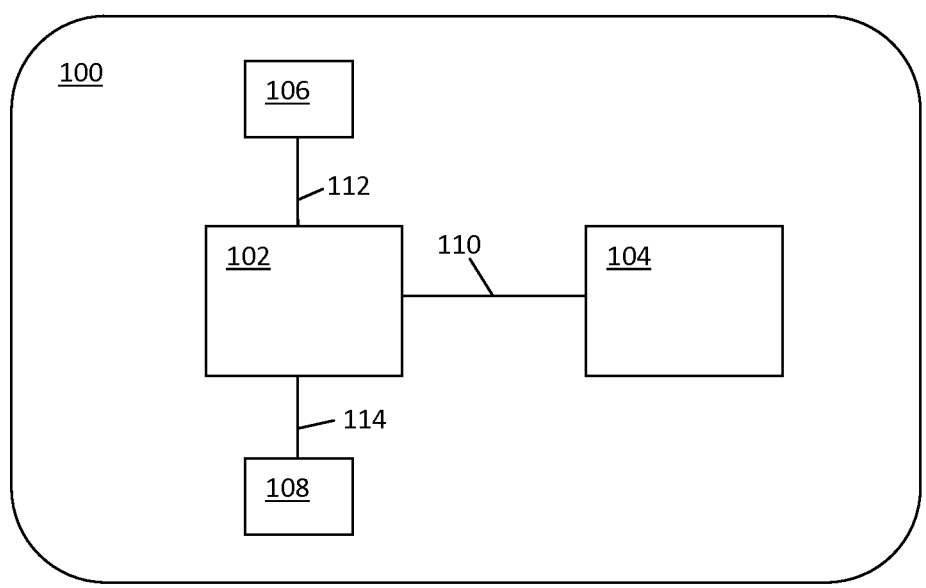
FIG. 1 shows an illustrative embodiment of a smart card.

FIG. 1 shows an illustrative embodiment of a smart card 100. The smart card 100 comprises a secure element 102 of the kind set forth and a microcontroller unit 104 of the kind set forth. Furthermore, the smart card 100 may comprise a contact-based interface unit 106, for example as standardized in the international standard ISO 7816, and a contactless interface unit 108, for example as standardized in the international standard ISO 14443. The secure element 102 may be able to control the contact-based interface unit 106 and the contactless interface unit 108. The secure element 102 is coupled to the microcontroller unit 104 through a connection 110, which may be serial Universal Asynchronous Receiver/Transmitter (UART) connection. Instead of a UART connection the connection 110 may be an I²C connection, an SPI connection or another connection. Furthermore, the secure element 102 is coupled to the contact-based interface unit 106 and the contactless interface unit 108 through connections 112 and 114, respectively.

Figure 2:
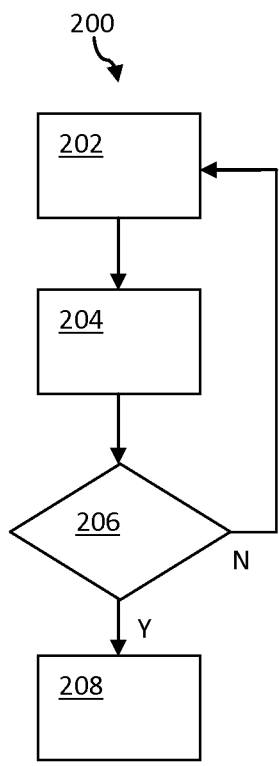
FIG. 2 shows an illustrative embodiment of a firmware installation method.

FIG. 2 shows an illustrative embodiment of a firmware installation method 200. In this embodiment, the microcontroller unit 104 enters 202 into an In-Application Programming (IAP) mode, which facilitates the installation of firmware into the memory unit of said smart card. The memory unit may be comprised in the microcontroller unit. For example, the memory unit may comprise an on-chip flash memory which is typically used as a program memory. Furthermore, the host device—more specifically a host application running on said host device—sends 204 a firmware image to the secure element 102 through the contact-based interface unit 106 or the contactless interface unit 108. The host device may be a personal computer, for example. The secure element 102 validates 206 the firmware image. If the firmware image is valid, then the firmware may be installed 208 in the memory unit.

The secure element 102 may validate 206 the firmware image as follows. The secure element 102 may calculate a checksum of the firmware image and compare the calculated checksum with a checksum stored in the firmware image. The checksum may be calculated using conventional hash or signature functions. Furthermore, the firmware image may have been encrypted by a firmware provider using a secret key. This secret key may also have been provided to the secure element 102, in which it may have been stored securely. The secure element 102 may decrypt the firmware image using the secret key, before calculating the checksum and comparing the calculated checksum with the stored checksum. Furthermore, the microcontroller unit 104 may calculate another checksum, in order to check whether the forwarded firmware image contains transmission errors, for example.

In the illustrative embodiment shown in FIG. 2 the microcontroller unit 104 enters 202 into the IAP mode. The IAP may provide a convenient way to install the firmware in the memory unit. In order to enter into the IAP the microcontroller unit should already contain an application. This application can be pre-installed in the microcontroller unit during the wafer test, for example. The pre-installed application may then be replaced by a new application using the below-described firmware update method, for example. The microcontroller unit may also be shipped with an empty program memory. In that case the microcontroller unit may verify during start-up whether an application is available. If no application is available, the microcontroller unit's boot loader may be started automatically, and said boot loader may wait for the download of an application, for example. The term 'boot loader' may refer in a broad sense to a computer program which performs self-test procedures and which loads the main operating system or runtime environment for a computer after completion of the self-test procedures.

Figure 3:
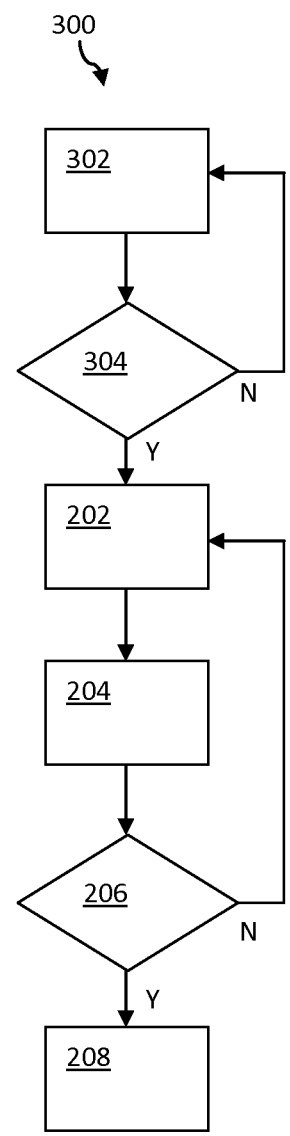
FIG. 3 shows an illustrative embodiment of a firmware update method.

FIG. 3 shows an illustrative embodiment of a firmware update method 300. In addition to the steps described with reference to FIG. 2, the firmware update method 300 comprises a step in which the host device sends 302 a firmware update request to the secure element 102, and a step in which the secure element validates 304 a certificate of this request. If the certificate is valid, then the steps described with reference to FIG. 2 may be performed. In this way, so-called field upgrades (i.e. upgrades of firmware on smart cards which are already in use) may be performed with an adequate level of security. The certificate may be a digital certificate, for example a number which is based on the above-mentioned secret key and a unique identifier (UID) of the secure element 102. For example, the secret key and the UID may be provided as inputs to a conventional cryptographic function. The output (number) of this cryptographic function may be used as the digital certificate. The host device may possess this digital certificate and send it to the secure element along with, or as an integral part of, the firmware update request. The secure element may verify 304 the certificate by extracting the UID and compare it to its own stored UID, for example. Since every smart card contains a secure element with a different UID, using the UID as input to the cryptographic function makes the certificate unique for every smart card, which may raise the bar for attackers. In particular, attacks may be countered in which a single firmware image is copied to a plurality of smart cards using a lost or stolen secret key.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF ACRONYMS

IAP In-Application Programming
UART Universal Asynchronous Receiver/Transmitter

LIST OF REFERENCE SIGNS 100 smart card
102 secure element
104 microcontroller unit
106 contact-based interface unit
108 contactless interface unit
110 connection
112 connection
114 connection
200 firmware installation method
202 enter IAP mode
204 send firmware image to secure element
206 validate firmware image
208 install firmware
300 firmware update method
302 send firmware update request to secure element
304 check certificate

The invention claimed is:

1. A method of programming a smart card, said smart card comprising a secure element and a microcontroller unit which is connected to said secure element, the method comprising:
   (a) the secure element receives a firmware image from a host device;
   (b) the secure element validates the firmware image, wherein the secure element validates the firmware image by calculating a checksum of the firmware image and comparing the calculated checksum with a checksum stored in the firmware image;
   (c) the secure element forwards the firmware image to the microcontroller unit only if the secure element has determined that the firmware image is valid based on the checksum comparison;
   (d) the microcontroller unit receives the firmware image from the secure element;
   (e) the microcontroller unit extracts firmware from the firmware image; and
   (f) the microcontroller unit installs the firmware in a memory unit of said smart card, wherein the memory unit is comprised in the microcontroller unit;
   wherein the firmware image comprises an update of previously installed firmware, and wherein the secure element further:
   receives a firmware update request from the host device,
   validates a certificate of said firmware update request, wherein the certificate is a number that is a cryptographic function of a secret key and a unique identifier (UID) of the secure element and wherein validating the certificate comprises extracting the UID from the certificate and comparing the extracted UID to a UID stored at the secure element, and
   performs steps (a), (b) and (c) only if said certificate is valid and only if the extracted UID matches the UID stored at the secure element.

2. A method as claimed in claim 1, wherein the secure element further decrypts the firmware image before calculating a checksum of the firmware image and comparing the calculated checksum with a checksum stored in the firmware image.

3. A method as claimed in claim 1, wherein the secure element receives said firmware image from the host device through a contact-based interface unit that operates according to International Standards Organization 7816 and/or a contactless interface unit that operates according to International Standards Organization 14443.

4. A method as claimed in claim 3, wherein the contact-based interface unit and/or contactless interface unit are controlled by the secure element.

5. A method as claimed in claim 1, wherein the microcontroller unit enters into an In-Application Programming (IAP) mode before receiving the firmware image from the secure element.

6. A method as claimed in claim 5, wherein the secure element instructs the microcontroller unit to enter into the IAP mode and wherein the secure element notifies the host device when the microcontroller unit is in the IAP mode, such that the host device may initiate programming of the smart card.

7. A method as claimed in claim 1, wherein the microcontroller unit comprises a boot loader which is started automatically during start-up of the microcontroller unit.

8. A programmable smart card, said smart card comprising a secure element and a microcontroller unit which is connected to said secure element, wherein:
 the secure element is connected to a contact-based interface unit that operates according to International Standards Organization 7816 and/or to a contactless interface unit that operates according to International Standards Organization 14443, wherein the contact-based interface unit and/or contactless interface unit are controlled by the secure element;
 the secure element is arranged to receive a firmware image from a host device, wherein the secure element receives said firmware image from the host device through the contact-based interface unit and/or through the contactless interface unit;
 the secure element is arranged to validate the firmware image, wherein the secure element validates the firmware image by calculating a checksum of the firmware image and comparing the calculated checksum with a checksum stored in the firmware image;
 the secure element forwards the firmware image to the microcontroller unit only if the secure element has determined that the firmware image is valid based on the checksum comparison;
 the microcontroller unit is arranged to receive the firmware image from the secure element;
 the microcontroller unit is arranged to extract firmware from the firmware image; and
 the microcontroller unit is arranged to install the firmware in a memory unit of said smart card, wherein the memory unit is comprised in the microcontroller unit;
 wherein the firmware image comprises an update of previously installed firmware, and wherein the secure element further:
 receives a firmware update request from the host device,
 validates a certificate of said firmware update request, wherein the certificate is a number that is a cryptographic function of a secret key and a unique identifier (UID) of the secure element and wherein validating the certificate comprises extracting the UID from the certificate and comparing the extracted UID to a UID stored at the secure element, and
 forwards the firmware image to the microcontroller unit only if the secure element determines that said certificate is valid and only if the extracted UID matches the UID stored at the secure element.

9. A smart card as claimed in claim 8, being an electronic identification card, a payment card or an access card.

10. A method of programming a smart card, said smart card comprising a secure element and a microcontroller unit which is connected to said secure element, the method comprising:

(a) the secure element receives a firmware image from a host device, wherein the secure element receives said firmware image from the host device through a contact-based interface unit that operates according to International Standards Organization 7816 and/or a contactless interface unit that operates according to International Standards Organization 14443, wherein the secure element is connected between the contact-based interface unit and the microcontroller and/or the secure element is connected between contactless interface unit and the microcontroller and wherein the contact-based interface unit and/or contactless interface unit are controlled by the secure element;
(b) the secure element validates the firmware image, wherein the secure element validates the firmware image by calculating a checksum of the firmware image and comparing the calculated checksum with a checksum stored in the firmware image;
(c) the secure element forwards the firmware image to the microcontroller unit only if the secure element has determined that the firmware image is valid based on the checksum comparison;
(d) the microcontroller unit receives the firmware image from the secure element;
(e) the microcontroller unit extracts firmware from the firmware image; and
(f) the microcontroller unit installs the firmware in a memory unit of said smart card wherein the memory unit is comprised in the microcontroller unit;
 wherein the firmware image comprises an update of previously installed firmware, and wherein the secure element further:
 receives a firmware update request from the host device,
 validates a certificate of said firmware update request, wherein the certificate is a number that is a cryptographic function of a secret key and a unique identifier (UID) of the secure element and wherein validating the certificate comprises extracting the UID from the certificate and comparing the extracted UID to a UID stored at the secure element, and
 performs steps (a), (b) and (c) only if said certificate is valid and only if the extracted UID matches the UID stored at the secure element.

11. A method as claimed in claim 10, wherein the secure element further decrypts the firmware image before calculating a checksum of the firmware image and comparing the calculated checksum with a checksum stored in the firmware image.

12. A method as claimed in claim 10, wherein the microcontroller unit enters into an TAP mode before receiving the firmware image from the secure element.

13. A method as claimed in claim 12, wherein the secure element instructs the microcontroller unit to enter into the TAP mode and wherein the secure element notifies the host device when the microcontroller unit is in the TAP mode, such that the host device may initiate programming of the smart card.

14. A method as claimed in claim 10, wherein the microcontroller unit comprises a boot loader which is started automatically during start-up of the microcontroller unit.

* * * * *